Figure 1:
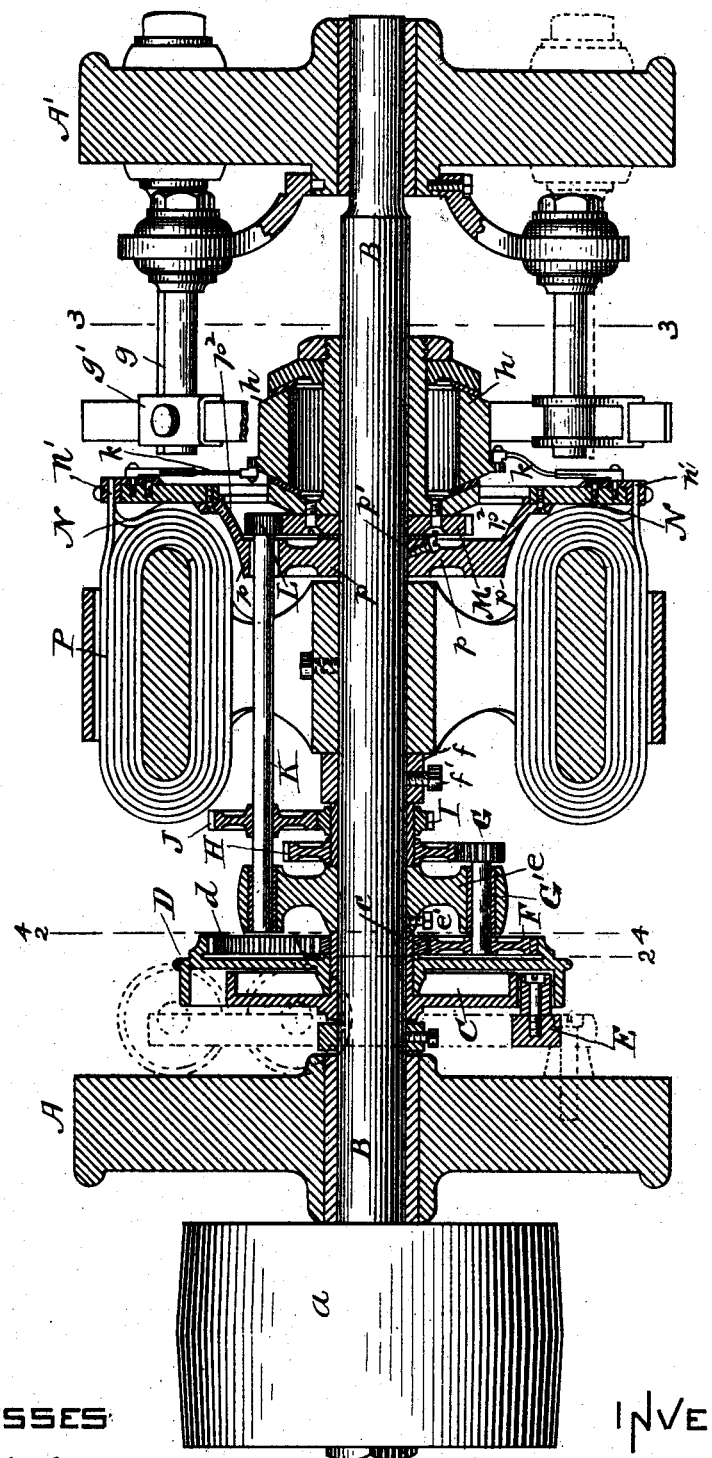

(No Model.) 5 Sheets—Sheet 1.

O. P. PHILBRICK.
AUTOMATIC REGULATOR FOR DYNAMO ELECTRIC MACHINES.

No. 505,207. Patented Sept. 19, 1893.

WITNESSES
Frank L. Parker
Clifford F. Crosby

INVENTOR
Orris P. Philbrick
by Bowdoin S. Parker
his atty.

UNITED STATES PATENT OFFICE.

ORVIS P. PHILBRICK, OF SOMERVILLE, MASSACHUSETTS.

AUTOMATIC REGULATOR FOR DYNAMO-ELECTRIC MACHINES.

SPECIFICATION forming part of Letters Patent No. 505,207, dated September 19, 1893.

Application filed April 2, 1892. Serial No. 427,455. (No model.)

*To all whom it may concern:*

Be it known that I, ORVIS P. PHILBRICK, of Somerville, in the county of Middlesex and State of Massachusetts, have invented a certain new and useful Improvement in Automatic Regulators, of which the following, taken in connection with the accompanying drawings, is a specification.

My invention relates more especially to automatic current regulators as applied to dynamo electric machines.

In the drawings like letters of reference indicate corresponding parts.

The devices hereinafter described, I illustrate in connection with a well known form of dynamo in public use. Several forms of regulators have been used for the purpose; chiefly however, in connection with devices for moving the brush holders and their brushes upon or around the commutator, thereby changing the position of the brushes to positions of higher or lower potential. My present invention accomplishes the same result in an entirely novel manner, the brushes remaining stationary. My devices are so arranged as to cause the commutator itself to automatically and positively move in relation to the brushes in the field and by this movement of the commutator, the higher or lower potential is reached as desired.

My invention also consists in a novel connection between the armature and the plates of the commutator, which connections allow a freer movement of the commutator within a limit fixed, in its relation to the armature, in either direction and which serves to perfect the connections and the insulations of the different parts.

Figure 2:
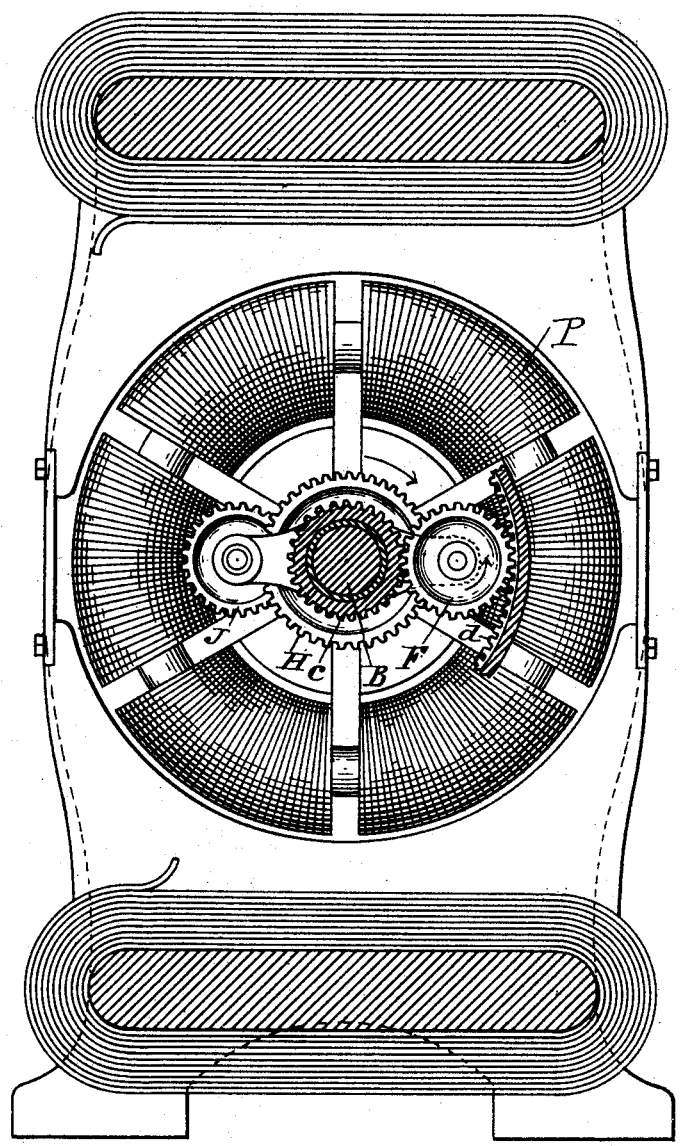
Figure 3:
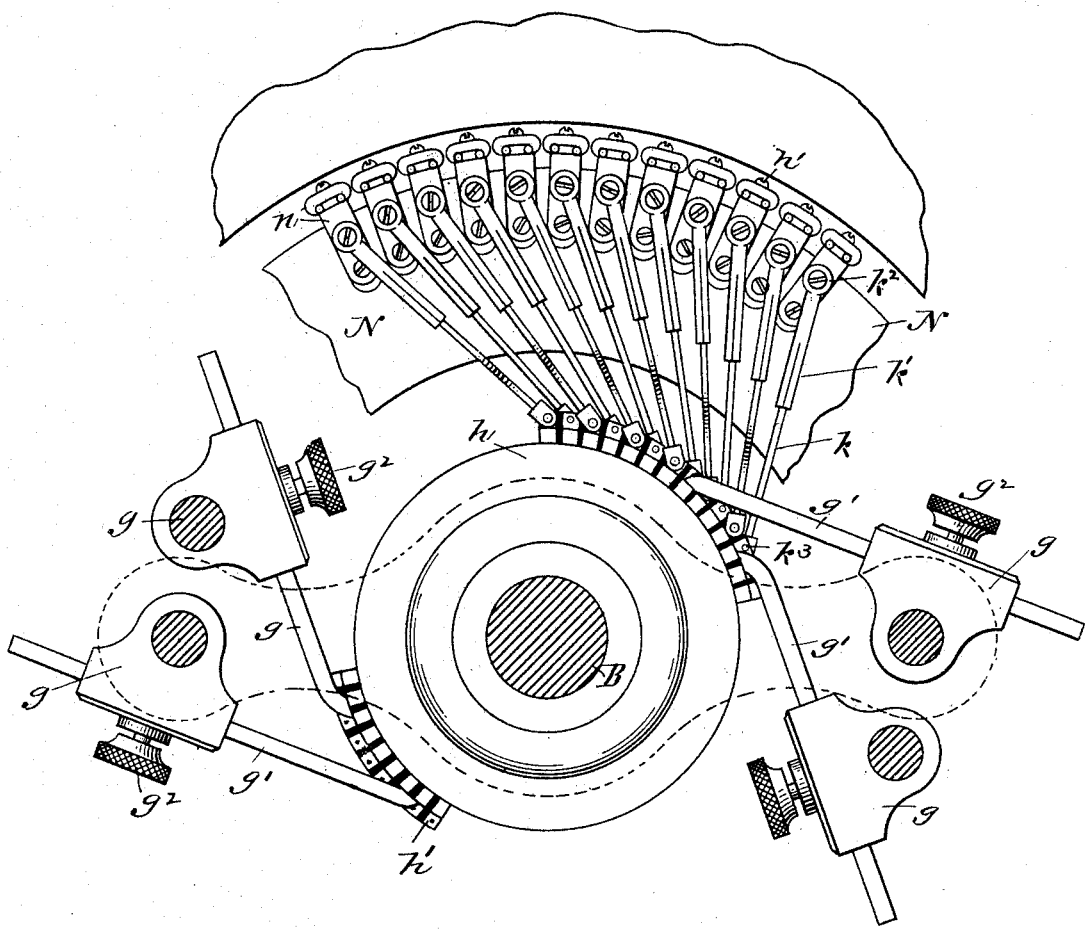
Figure 4:
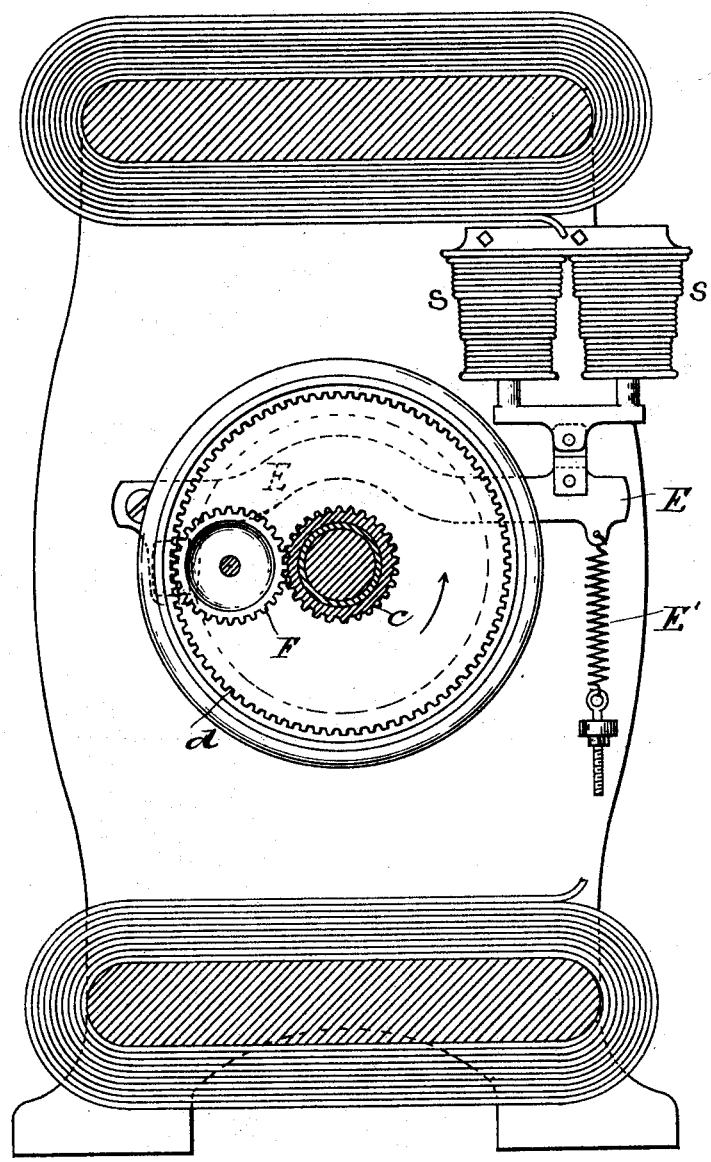
Figure 5:
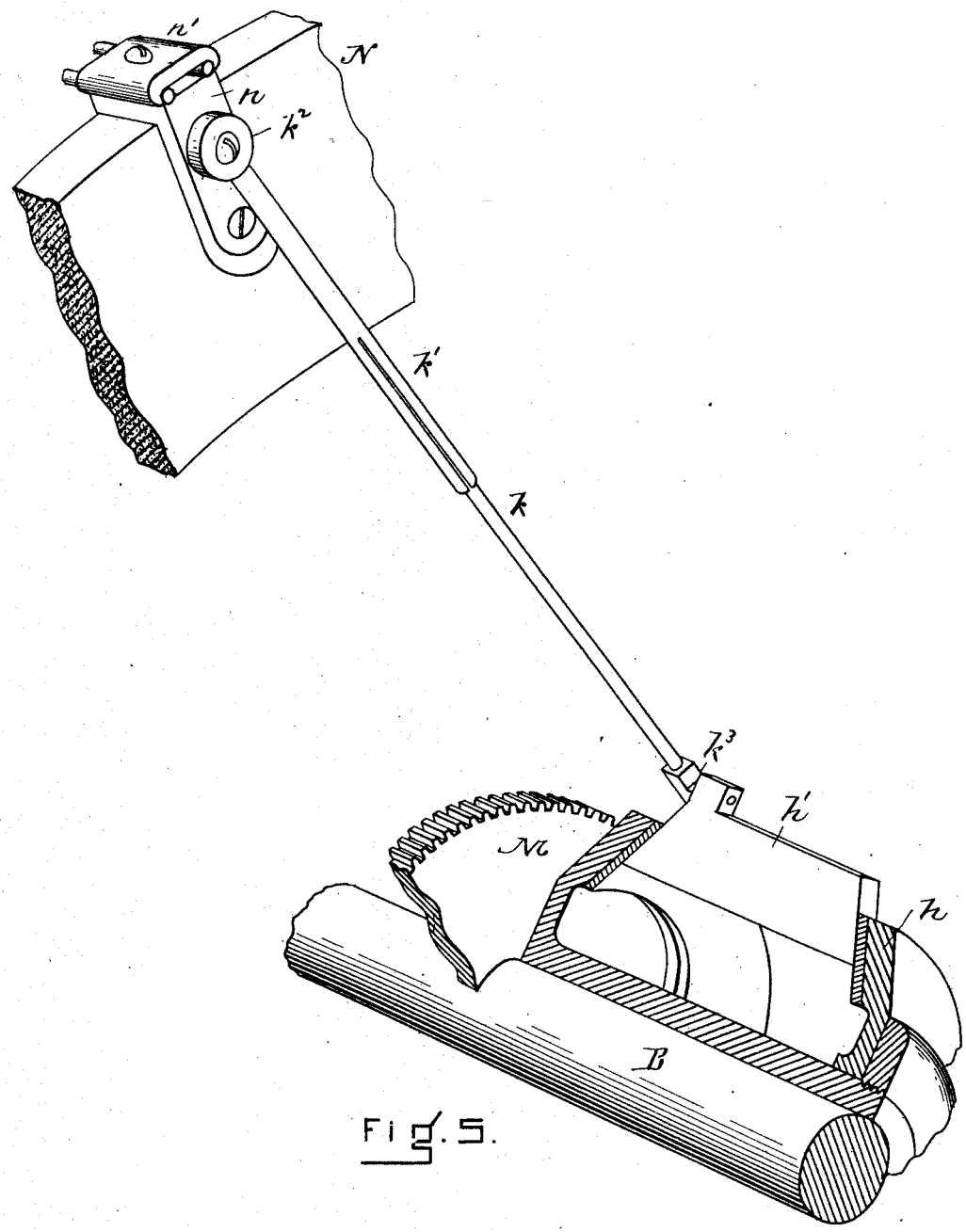

In the drawings, Figure 1, is a horizontal sectional view of a dynamo of the American pattern, and in connection with which the principal parts of my improvements are illustrated. Fig. 2, is a vertical section on line 2, 2 of Fig. 1, looking toward the pulley end. Fig. 3, is a sectional view on line 3, 3, of Fig. 1, illustrating the commutator and its connection with the armature. Fig. 4, is a vertical section on line 4, 4, of Fig. 1. Fig. 5, is a perspective view of my improved connections of the commutator and armature.

In Fig. 1, A. A' is the frame of the machine; B the arbor or main shaft; a the driving pulley on arbor. B. C is an inner friction wheel. D is an outer friction wheel. Wheel C is loose on arbor B, and has on its hub the gear, c. The outer wheel D, is loose on the hub of inner wheel C, and has formed underneath its rim, the internal gear d. The gear c meshes into gear F, and F meshes in the inner gear of d of wheel D. Gear F is secured at one end of small shaft G'; and on the other end is secured gear G. Shaft G' is journaled in hub e, and said hub e is secured to shaft B, by set screw e' or other suitable means. Gear G meshes in gear H and I into J; the latter being secured to shaft K and shaft K journaled into hubs e and p. Hub p is also secured to shaft B. On the opposite end of shaft K is secured the gear L, which meshes with gear M on the commutator h. The commutator is not rigidly secured to shaft B, but may be revolved by the action of the gears described, upon the shaft B. g, g, are the brushholders, and g', g', the brushes.

Now referring to Fig. 4; S, S, represent the solenoids which are connected with the circuit; the full current passing through them. E is a lever or brake secured to the frame and is moved upward by the current, against the spring E'. When the current is weakened the spring will of course draw the brake E downward. The opposite end of brake E, is formed to nearly fill the space between the rim of inner wheel C, and the rim of outer wheel D, and a slight movement of the lever or brake E, will press it against the wheel C or the wheel D, according as it is moved up or down.

The operation of the regulator is as follows: The solenoids, S, S, being connected directly in the circuit, the full current passing through them, when the current is at the proper potential, the pull of the solenoids, acting against the retractile spring E', is just sufficient to hold the brake E midway between the rims of the friction wheels C and D. If the current should become too strong, the solenoids S, S, would attract the armature raising the lever brake E, causing said brake E, to press upon the rim of inner friction wheel C, holding it or retarding its motion; this will cause gear c, on the hub of wheel C, to act upon gear F, which will turn in inner gear d of wheel D. (See Fig. 4.) This will communicate to the train of gears G, H, I, J, L to gear M, attached to the communicator $h$, and the commutator will be moved back to a point of less potential. In case a higher potential is required the spring E' will pull down the brake E, and the opposite end will press the rim of wheel D, and through the train of gears the commutator will of course be moved in the opposite direction and a point of higher potential will be reached. In this manner the current will automatically adjust the commutator in respect to the contacting brushes in the field and the regulation of the current will be constantly maintained, as desired.

In the ordinary dynamo the connections between the commutator $h$ and the armature P is rigid or is composed of wire, more or less flexible, but as the commutator moves with the rest of the machine and is secured to the main shaft, these answer the purpose fairly well. In my invention this form would be unsuited as the commutator not only revolves generally with the shaft, but it also moves on the shaft back and forth as it may be actuated by the train of gears as hereinbefore described. I therefore have devised the telescopic connections shown in Figs. 3 and 5, and in connection therewith an improved insulation. The connecting rod $k$, $k'$, is formed of two parts, one moving within the other. Rod $k$ and $k'$, is connected to the commutator plate $h'$, at one end and to the armature part P, at the other, through clasp $n$. The telescopic action of the two parts of the rod $k$, $k'$, movably secured at each end as described, permits of the revolving of the commutator without injury to the connections. As the commutator is moved by the train of gears as hereinbefore described, its relative position to the armature is also changed and the connecting rod $k$, is drawn out more or less in its telescopic connection with the part of connecting rod $k'$. The ends of rod $k$, $k'$, being movably secured or pivoted, one to the commutator plate and the other to the armature part, a free movement of the parts will take place in either direction, without danger of breaking the connection or interrupting the flow of the current, in the least. If however, one of the connecting rods should be accidentally broken, from any cause, it can be easily and cheaply repaired.

In Fig. 3, is shown in detail the devices connecting the commutator and armature. The hub $p$ (Fig. 1,) is secured to shaft B, by set screw $p'$ or other suitable means, and said hub $p$ is extended above the arbor or shaft K, by the part $p^2$. In this part or rim $p^2$, is secured a rigid non-conducting strip of material, N, preferably made of wood pulp or fiber. The clasp $n$ is secured to the said circular strip of fiber or non-conducting material and the rod $k'$ is pivoted to said clasp $n$ as shown in Figs. 3 and 5. The wire connection with the armature part P, is made at $n'$, and can be easily made or removed in a moment. This form of insulated connection is I conceive a great improvement over any now in use and is suited to any dynamo whether the commutator is fixed or movable upon the main shaft.

Each connecting rod is complete in itself and is more durable and easier of adjustment than any form known to me. I do not confine myself to the exact form of parts, and connections shown as these may be varied somewhat without departing from the spirit of my invention, as for instance, the train of gears may be larger or smaller according to speed and requirements of the dynamo; by varying the number and relative size of the gears, a quicker or slower action may be communicated to the commutator and the regulation of the current made as desired. The form and relative arrangement of parts in different styles of dynamos, would also necessitate the changes in form and size of parts suggested, but the principle and method upon which my improved automatic regulator operates, would remain the same, and the end sought would be attained by equivalent means and devices.

The means described for moving the brake E by the action of the electric current, in connection with the solenoids S, S, and spring E' is well known in the art and is used for various purposes. I am aware also that the telescopic principle is not new in itself but its use in this connection and combination is original with me.

Having now described my invention, what I claim, and desire to secure by Letters Patent of the United States, is—

1. In a dynamo, the brake E adapted to be operated by the solenoids S, S, and spring E', in combination with the wheels C and D arranged and adapted to change the position of the commutator relatively to the armature, by means of a train of gears, connecting said wheels C and D with said commutator, substantially as and for the purposes set forth.

2. In a dynamo, an automatic regulator, adapted to be operated by the action of the main current of the machine through suitable means, and consisting of a brake, arranged to contact with either one of two loose wheels, said wheels being connected with the commutator of the dynamo, by a train of gears, and adapted to change the position of the commutator relatively to the armature, according as the said brake is applied to retard the one or the other of said wheels, all combined, substantially as and for the purposes set forth.

3. In a dynamo, an automatic regulator consisting of the combination of the brake E, adapted to be operated by suitable means by the action of the main current, the loose wheels, C and D, the train of gears, $c$, F. G. H. I. J. L. M. and the commutator $h$, all arranged as described and substantially as set forth.

4. In a dynamo, the brake E, arranged to be moved by the current in the main circuit by suitable means, the commutator the wheels C and D, a train of gears connecting said wheels with the commutator in combination with the telescopic connecting rods $k\ k'$, and insulator N, all combined and adapted to operate substantially as and for the purposes set forth.

5. In a dynamo, the rod $k\ k'$ having a telescopic connection and pivotally secured to the commutator or the commutator plate and the armature or its connections substantially as and for the purposes set forth.

6. In a regulator for dynamo electric machines, having a variable field, the combination of a commutator capable of rotating on its shaft relatively to the armature, a train of gears connecting therewith, loose wheels upon main shaft in said train, a brake for retarding the movement of either of said wheels and a magnetic device for controlling the brake, substantially as described.

7. In combination with a dynamo, the connecting rod $k,\ k'$, pivotally connected at each end, the insulating material N, the hub $p$ and the clasp $n$, the said parts suitably arranged to form a movable connection between the commutator and the armature, substantially as and for the purposes set forth.

In testimony whereof I have signed my name to this specification, in the presence of two subscribing witnesses, on this 30th day of March, A. D. 1892.

ORVIS P. PHILBRICK.

Witnesses:
BOWDOIN S. PARKER,
FRED. W. STEVENS.